United States Patent [19]

Szablak et al.

[11] Patent Number: 5,092,507

[45] Date of Patent: Mar. 3, 1992

[54] MODULAR WORKSTATION FOR AUTOMOBILE

[75] Inventors: Michael J. Szablak, Wooster, Ohio; Glen E. Tomblin, Winchester, Va.

[73] Assignee: Rubbermaid Incorporated, Wooster, Ohio

[21] Appl. No.: 552,025

[22] Filed: Jul. 13, 1990

[51] Int. Cl.$^5$ .............................................. B60R 7/00
[52] U.S. Cl. .................................. 224/275; 224/277; 224/279; 108/44; 312/235.8
[58] Field of Search ............... 224/275, 277, 279, 281, 224/282, 42.43, 273; 108/44; 312/301, 235.8, 302; 220/23.4, 23.83; 206/232, 372

[56] References Cited

U.S. PATENT DOCUMENTS

| | | | |
|---|---|---|---|
| 3,061,394 | 10/1962 | Whetstone | 312/235.8 X |
| 3,338,629 | 8/1967 | Drees | 224/275 X |
| 3,873,010 | 3/1975 | Patterson | 224/275 |
| 3,909,092 | 9/1975 | Kiernan | 224/275 X |
| 3,922,973 | 12/1975 | Sturgeon | 312/235.8 X |
| 3,949,917 | 4/1976 | Mann | 224/277 X |
| 4,512,503 | 4/1985 | Gioso | 224/275 X |
| 4,577,788 | 3/1986 | Richardson | 224/273 |
| 4,619,386 | 10/1986 | Richardson | 224/277 |
| 4,832,241 | 5/1989 | Raddiffe | 224/275 |
| 4,942,827 | 7/1990 | Norgaard | 108/44 |
| 4,946,120 | 8/1980 | Hatcher | 108/44 |

FOREIGN PATENT DOCUMENTS 2223466  4/1990  United Kingdom ............... 224/275

OTHER PUBLICATIONS

Sell Sheet, The Auto Office Company, 2905 Dogwood Road, P.O. Box 152, Springfield, OH 45501.

Primary Examiner—Henry J. Recla
Assistant Examiner—Glenn T. Barrett
Attorney, Agent, or Firm—Richard B. O'Planick

[57] ABSTRACT

A modular workstation (2) is disclosed comprising a base container (4) for positionment on an automobile seat. A top surface (10) of the base container constitutes a writing surface, which is movable from a storage position to a second position in writing proximity to the workstation user. A secondary storage container (6) is integrally molded with the base container, inboard thereof, and a channel (64) is provided for receiving a seat belt. A third storage container (8) can be attached to an outward surface of the base container, for use in transporting files to and from the vehicle. The writing surface (10) mounted to the top of the base container is removable from the container, whereby providing the user with a transportable writing surface if so needed.

30 Claims, 7 Drawing Sheets

MODULAR WORKSTATION FOR AUTOMOBILE

BACKGROUND OF THE INVENTION

1. Field of the Invention

The subject invention relates generally to workstations providing a user with a writing surface, and a container for holding files and writing accessories. Specifically, the subject invention relates to a modular workstation which can be used in an automobile or the like, capable of providing the occupant driver with a conveniently located writing surface and a file storage container.

2. The Prior Art

Many individuals, such as those employed in sales or product delivery, conduct their business from an automobile, truck, or the like. Generally, they visit customers or clients and must carry with them certain documents associated with their job responsibility. Working from their automobiles or trucks, such individuals in the course of their duties need to make written notations or memoranda during the day, and have access to file information on their customers or clients.

Heretofore, such activities, when conducted from the confines of an automobile or the like, have been inconvenient and cumbersome. In order to access necessary files, individuals use a brief case, or transportable file box. When visiting a customer, they transport all files back and forth from the automobile, even when only several of their files are needed at any given time. The size and weight of such file boxes make their transportation back and forth both burdensome and inconvenient. In addition, performing notation or writing duties, when conducted from the automobile, is difficult and awkward. The use of a conventional clipboard or the like, being unsupported in a car, requires that one hand be used in supporting the clipboard while writing.

The above summarized conventional products have failed to satisfy the needs of workers who must conduct their activities from an automobile, when such activities involve file maintenance and writing. No currently available products provide the transient worker with the means for conveniently storing documents or files, easily transporting certain of such files between the vehicle and the customer or client, and in addition providing the user with a convenient surface on which to write, proximate the driver's seat of the vehicle.

SUMMARY OF THE PRESENT INVENTION

The aforementioned shortcomings of conventional products have been overcome by the present invention, which provides a modular workstation for an automobile or the like. The workstation comprises a base container having side walls, and a bottom surface for positionment on an automobile seat, proximate to the workstation user. The top surface of the base container supports a writing surface, which is movable from a storage position to a second position in writing proximity to the workstation user. The writing surface is fully supported by the base container throughout its movement. In addition, a further element of the present invention is to provide a secondary storage container inboard of the base container, and separated therefrom by a channel which receives a seat belt, whereby restraining the workstation on the seat of the automobile. The secondary storage container can be used for permanent filing needs. Yet a further element of the present invention is to provide a third storage container outward of the base container, and removably attached thereto. The third container is deep enough to extend below the top surface of the automobile seat, whereby stabilizing the workstation on the seat. Simple upward removal of the third container from the base container enables the user to conveniently carry only those files which are needed, leaving the remainder behind. A further element of the present invention is to make the writing surface mounted to the top of the base container removable from the base container, whereby providing the user with a transportable writing surface if so needed.

Accordingly, it is an objective of the present invention to provide a modular workstation for an automobile or the like.

Yet a further objection is to provide a modular workstation having an adjustable writing surface thereon, which can be moved relative to the workstation user.

Still a further objective of the present invention is to provide a modular workstation having compartmented storage capability.

A further objective of the present invention is to provide a modular workstation for an automobile having seat belt restraint compatibility.

A further objective is to provide a modular workstation for an automobile having a removable file bin, whereby enabling the user to transport selected files to and from the vehicle.

Still a further objective of the present invention is to provide a modular workstation having a removable writing surface, whereby providing the user with a transportable writing surface.

Yet a further objective is to provide a modular workstation which is easily and economically produced and assembled, and which comprises relatively few component parts.

These and other objectives, which will become apparent to one skilled in the art, are achieved by a preferred embodiment which is described in detail below, and which is illustrated in the accompanying drawings.

DESCRIPTION OF THE PREFERRED EMBODIMENT

Figure 1:
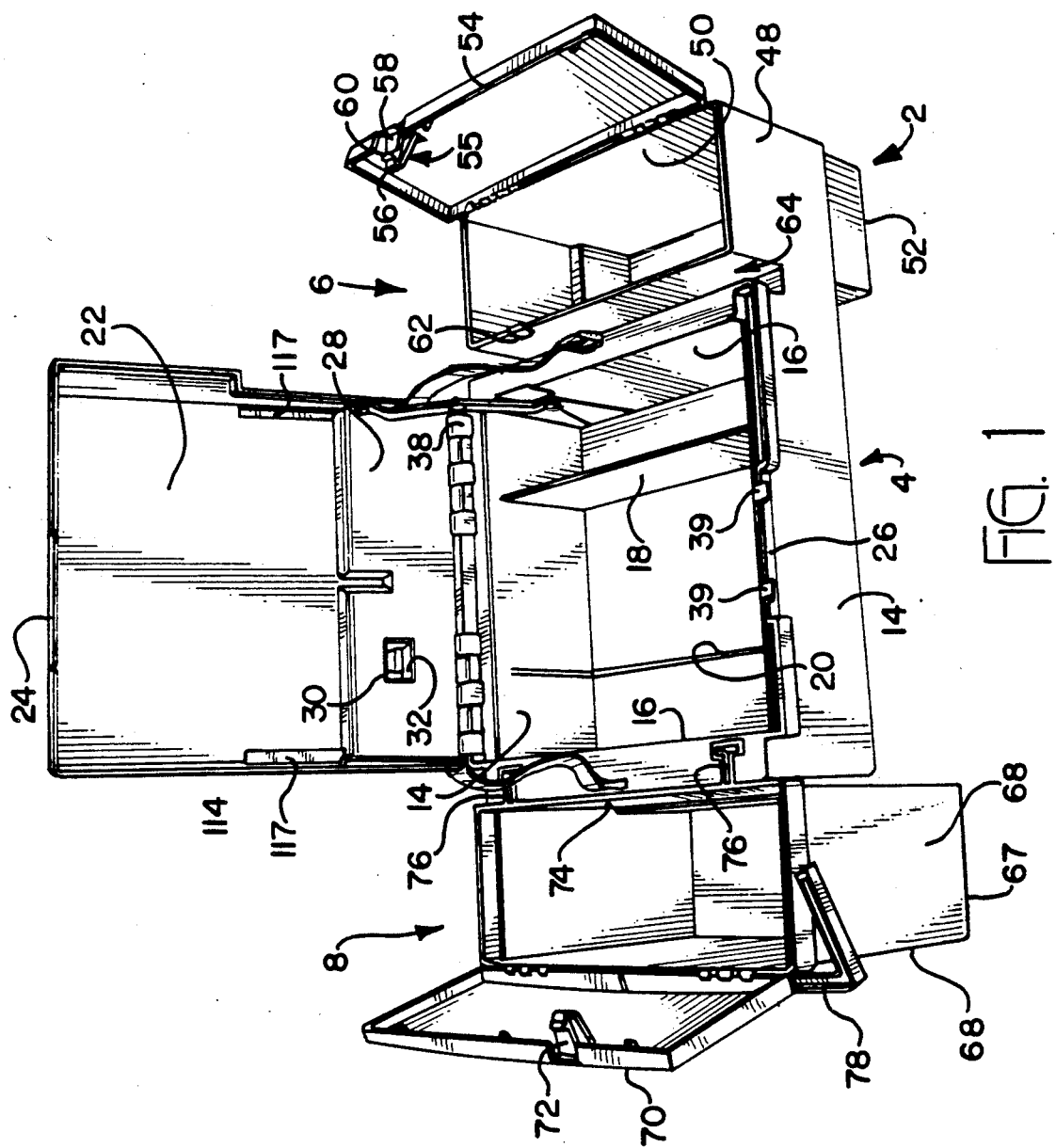
FIG. 1 is an assembled front perspective view of the subject workstation, showing the lids of the various container components in the open position.
Figure 2:
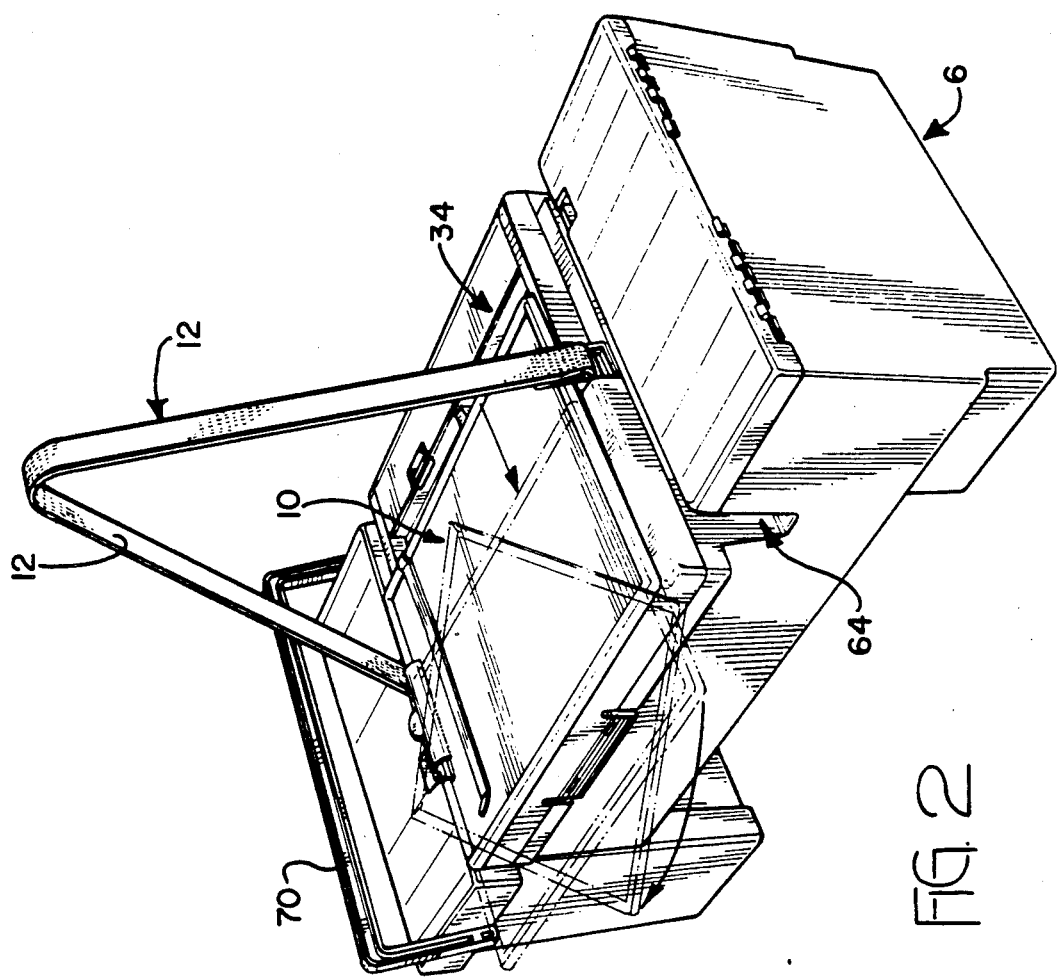
FIG. 2 is a right front perspective view of the subject workstation, with the lids in the closed position.

Referring first to FIGS. 1 and 2, the modular workstation 2 is shown to comprise a central storage body 4, an ancillary file bin 6, a removable file bin 8, and a clipboard assembly 10. A strap 12 is connected to the central storage body 4 as shown, to provide means for transporting the workstation 2 to and from an automobile or the like.

The central storage body 4 is conventionally molded of plastics material, preferably polystyrene, and includes sidewalls 14, and endwalls 16 which define an internal storage space. An elongate rectangular divider panel 18 spans the sidewalls 14, and resides within one of several grooves 20 provided in the container.

A hinged lid 22 is provided, having a downwardly dependent cantilevered clasp flange 24 along a forward rim. A correspondingly positioned retention flange 26 is provided in an upper rim of a forward sidewall 14 of the storage body 4. Disposed within the lid 22 is a writing utensil storage compartment 28, having a through slot 30, partially defined by retention edge 32. A lid 34 encloses the top of the compartment 28, and is provided with a downwardly dependent, U-shaped locking finger latch 36 (see FIG. 3).

Figure 3:
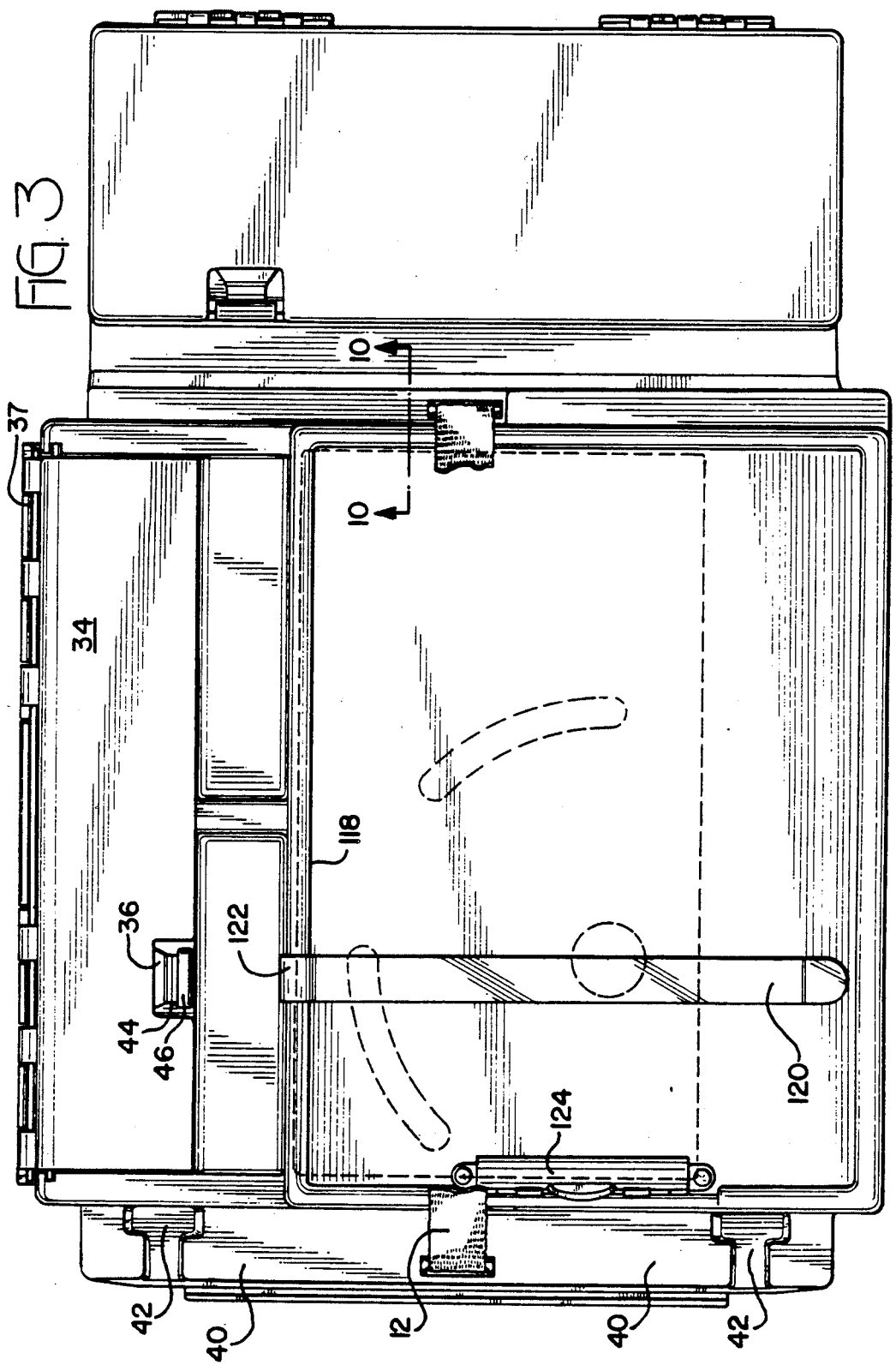
FIG. 3 is a top plan view of the subject workstation.

As shown in FIGS. 1 and 3, a hinge mechanism 37 extends along an outward edge of lid 34, enabling the lid component 34 to open upwardly. Likewise, a hinge 38 is provided to make the lid 22 of central storage body 4 pivotal upward, whereby making the internal storage compartment of body 4 accessible. Extending along a side of central storage body 4 is an upper top ledge surface 40, having two spaced apart T-shaped sockets 42 formed to extend downwardly therein. It will be appreciated that the latch 36 in lid 34 comprises a bight portion 44, and an upturned remote finger portion 46. The resiliency of the plastic enables portion 46 to flexibly engage over a suitably positioned flange in the socket, whereby latching lid 34 into a closed position.

The ancillary file bin 6 is integrally molded with body 4, of identical plastic material. Bin 6 is defined by endwalls 48, and sidewalls 50 which define an internal storage compartment suitable for receiving files or the like. A lower portion 52 of the bin 6 is stepped inward and provides a platform for supporting the workstation 2 on the seat of an automobile. It will be appreciated that the bin 6 is intended for positionment against the backrest of the seat, while the lower portion 52 rests upon the seat's upper surface. A pivotally hinged lid 54 encloses the top of the bin 6, and is provided with a latch 55 of similar configuration to the latch 36 of lid 22. Latch 55 comprises a bight portion 56, having an upturned finger 58. A locking flange 60 is provided on the upturned finger 58, positioned to engage a U-shaped flange clip 62 which is attached over an upper edge of sidewall 50. Flange clip 62 is metallic in construction, and snaps over the upper edge of sidewall 50, whereby providing a flange over which upturned finger 58 engages.

It will be appreciated from FIG. 1 that situated between the central bin 4 and the ancillary storage bin 6 is an elongate transverse rectangular channel 64. Channel 64 is of a depth and width to admit a seat belt therethrough, whereby restraining the overall assembly 2 on the seat of an automobile or the like.

The removable file bin 8 is independently molded of conventional plastics material, preferably polystyrene. Bin 8 comprises endwalls 66, and sidewalls 68, which define an internal storage compartment for hanging files. It will be appreciated that a lower portion 67 of bin 8 extends downwardly beyond the lower edge of central body 4, as shown in FIG. 1. Portion 67, with the workstation suitably situated on the seat of an automobile, extends downwardly beyond the top surface of the seat, whereby stabilizing the workstation 2 on the seat. Portion 67, when coupled with the seat belt retention previously described, maintains workstation 2 in a stable position on the seat.

Bin 8 is provided with a hinged lid 70, having a latch mechanism 72 molded in to a forward-most edge. Latch 72 engages a retention flange 74 in the forward sidewall 68. A pair of T-shaped bosses 76 extend outwardly from the forward sidewall 68, as shown in FIG. 1. Bosses 76 are dimensioned to be closely received within the corresponding T-shaped recesses or sockets 42 of central body 4. A handle 78 is pivotally affixed to the bin 8 as shown, to assist the user in lifting the bin 8 out of receptacle sockets 42, making the bin 8 useful for moving selected files to and from the automobile.

Figure 10:
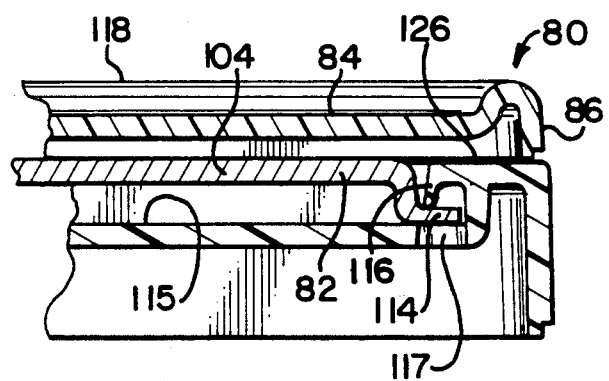
FIG. 10 is a section view through the clipboard assembly, taken along the line 10—10 of FIG. 3.

Referring now to FIGS. 3, 4, 5, 6, and 10, the clipboard assembly 10 is shown to comprise a clipboard top 80 which is molded of plastics material, preferably polystyrene; and further comprising a metallic subplate 82 of rectangular shape. As best shown in FIG. 10, the clipboard top 80 has a recessed central planar surface 84, and a downturned edge flange 86. An underside surface 88 (FIG. 6) is downwardly directed, and reinforcement ribs 90 extend outward in radial fashion from the center of the underside surface 88.

Figure 4:
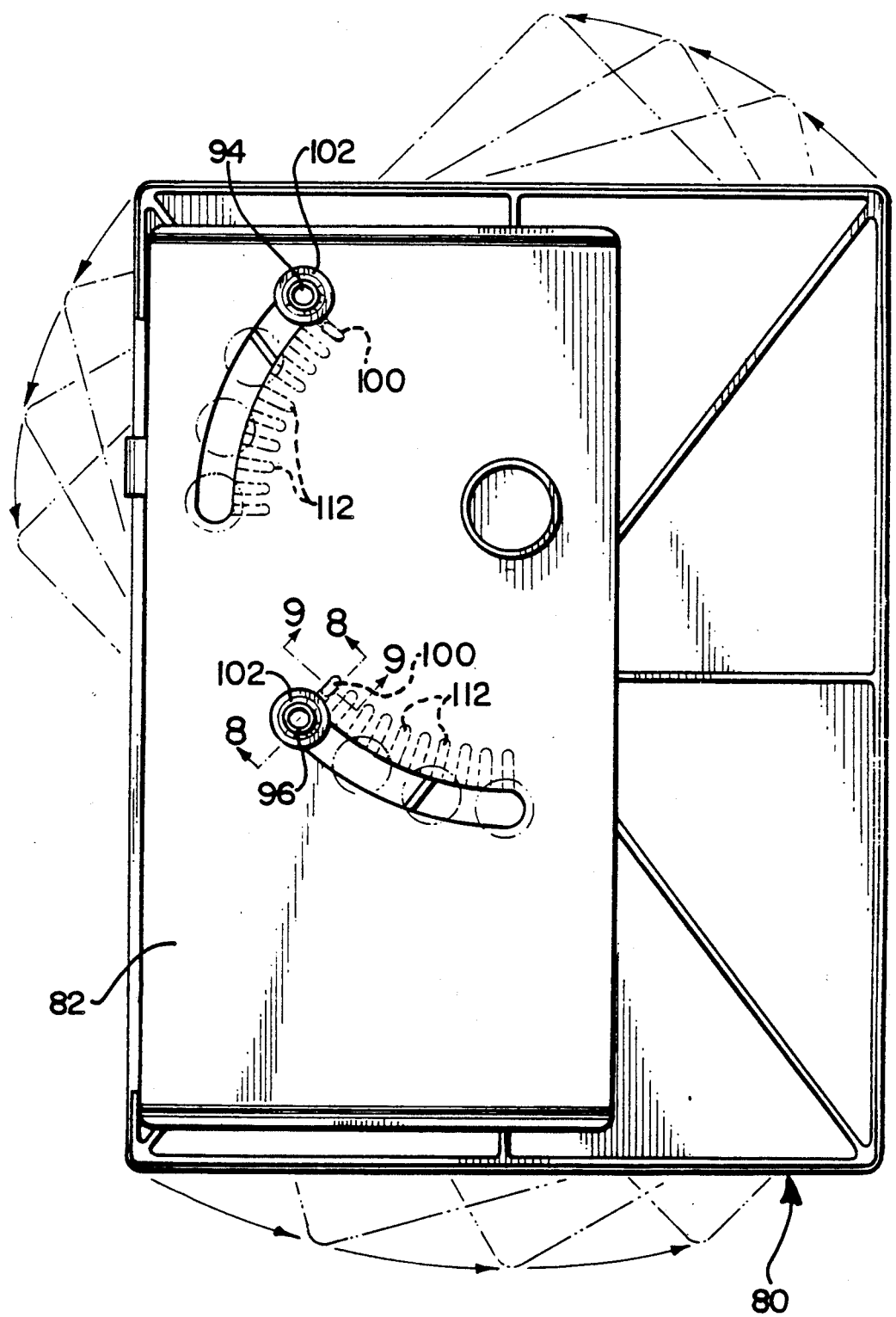
FIG. 4 is a bottom plan view of the writing surface assembly of the subject workstation.
Figure 6:
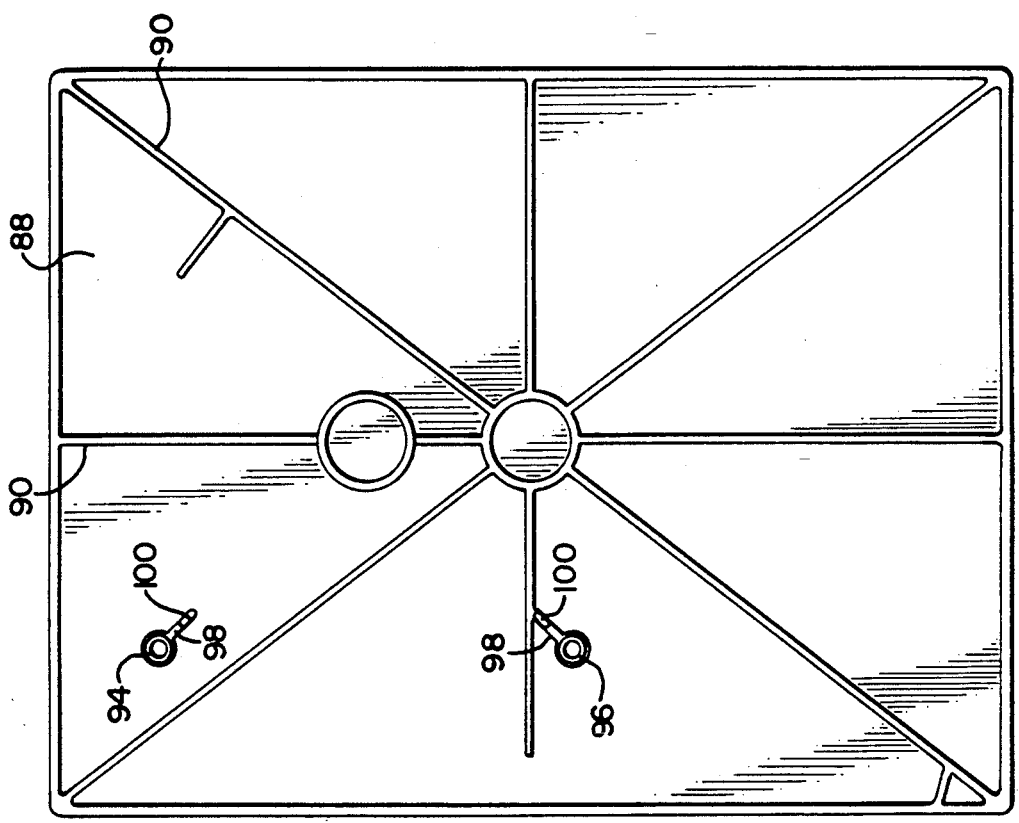
FIG. 6 is a bottom plan view of the clipboard body.

With continued reference to FIG. 6, the bottom of the clipboard top 80 is provided with a circular raised boss 92, eccentrically positioned to depend downwardly from the surface 88. A first post 94 and a second post 96 are positioned apart at the bottom surface 88, and project downwardly therefrom. Flanges 98 extend outwardly from each of the posts 94, 96, and a locking finger flange 100 projects downwardly from each of flanges 98. A circular retention washer 102, as shown best in FIG. 4, is press fit over each post 94, 96, to assemble the subplate 82 to the clipboard top 80.

Figure 5:
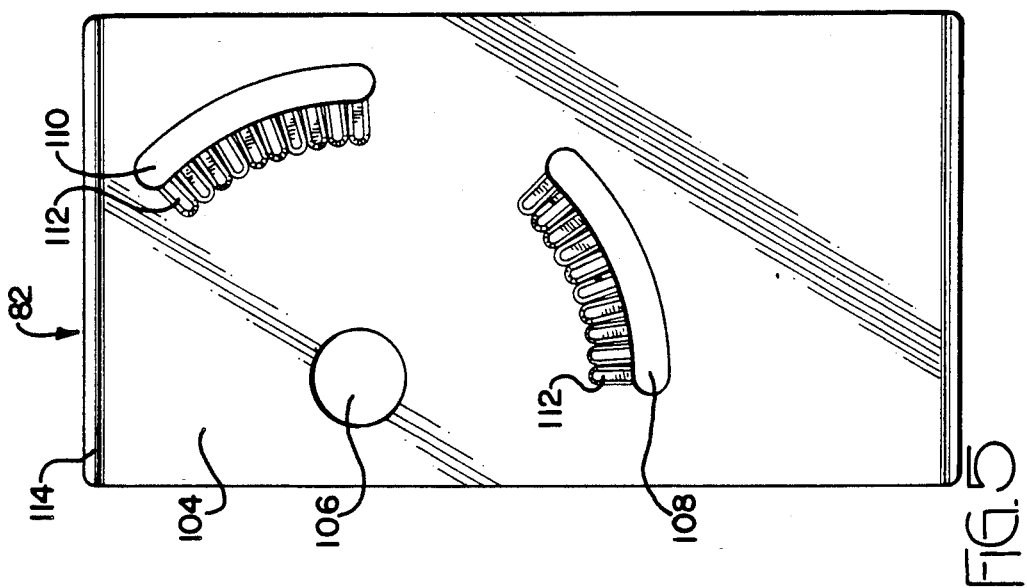
FIG. 5 is a top plan view of the subplate of the writing surface assembly.
Figure 7:
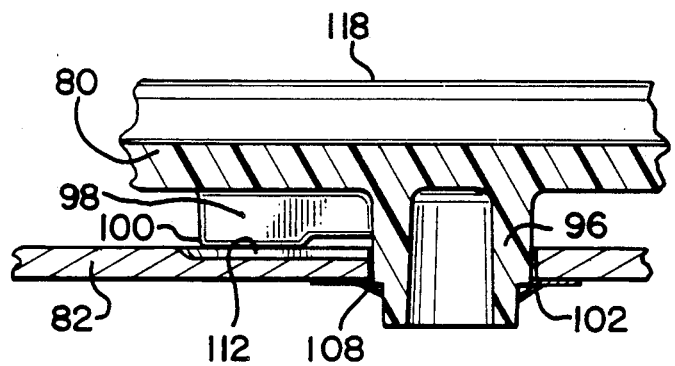
FIG. 7 is a partial transverse section view through one of the clipboard assembly posts, with the clipboard partially rotated to a position between detents.
Figure 8:
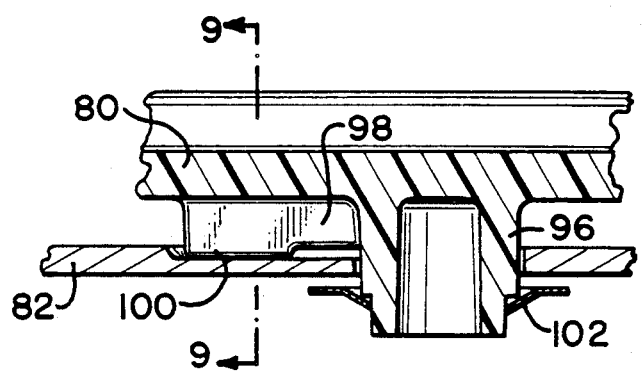
FIG. 8 is a partial section view through the clipboard assembly, taken along the line 8—8 of FIG. 4.
Figure 9:
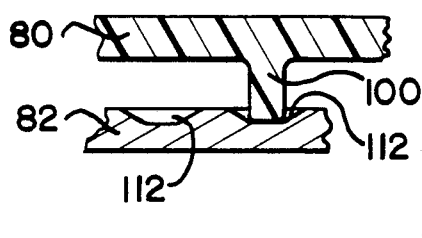
FIG. 9 is a section view taken through the clipboard assembly, along the line 9—9 of FIG. 8.

Referring to FIG. 5, the subplate 82 is provided with a plate midsection 104, having an assembly aperture 106 extending there-through. Arcuate guide slots 108, 110, are positioned to extend circumferentially about the assembly aperture 106, and are of an elongate ovular configuration. A series of detents 102 are positioned along an inward side of each guide slot 108, 110, with the detents 102 formed within the mid-section surface 104. It will be appreciated that the detents 112 are generally of elongate configuration. Subplate 82 has a downturned edge flange 114 along the two short sides thereof.

Figure 11:
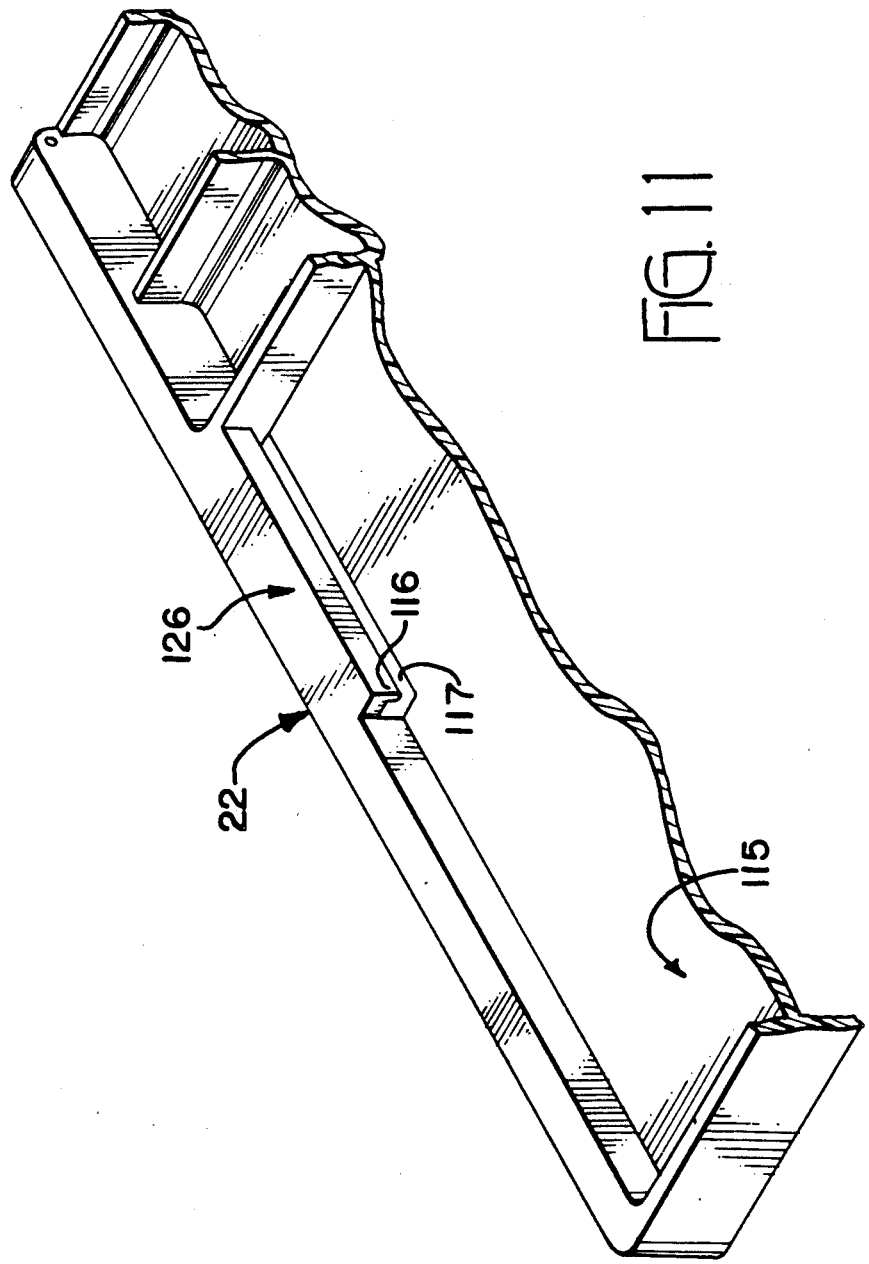
FIG. 11 is a partial top perspective view of the base container top surface, with the clipboard assembly removed therefrom.

As shown in FIGS. 10 and 11, the lid of the base container is provided with a top ledge portion 126 along each side, and a central recessed surface 115. An inwardly directed downturned edge flange 116 extends partly along opposite sides defining recess 115, and slots 117 (one of which being shown in FIG. 11) extend the through recessed surface 115 below edge flanges 116. It will be appreciated that a channel is defined by each of the edge flanges 116, which extends approximately half-way back along the sides of recessed surface 115.

As shown in FIG. 3, the clipboard top includes a top perimeter rim 118. A line guide bar 120 is further provided. Line guide bar 120 is formed of metal, having an outward clamping spring end 122 which affixes to, and slides downward along, the top rim 118 of the clipboard. As shown, the clipboard in conventional fashion has a pivotally mounted clip 124 at a top end, whereby the clipboard can retain papers between the clip 124 and the top clipboard surface.

Assembly of the subject invention proceeds as follows. With reference to FIG. 1, the central storage body 4 and ancillary file bin 6 are unitarily molded. Thereafter, the lid components 22, 54, are assembled respectively to the containers, in hinged fashion. The storage compartment 28 provides an enclosed region for storage of writing utensils, which can be readily accessed by the hinged upper lid. Lid 22, when pivoted upward, exposes the interior of the storage body 4, and the files or articles contained there. Divider 18 provides the means for segregating the internal storage cavity of central body 4.

As explained above, channel 64 receives a seat belt there-through, whereby restraining the workstation 2 on the seat of an automobile or the like.

With continued reference to FIGS. 1 and 3, the removable file bin 8 is dropped into the T-shaped sockets 42 of central body 4, and thereby is suspended along a forward edge of the automobile seat. Portion 67 depends below the top surface of the seat, whereby adding stability to the overall unit. Since bin 8 is suspended over the front edge of the automobile seat, it can be dimensioned to have a greater depth than bin 6. At the option of the user, documents can be transferred to bin 8 from either bin 4 or 6, and transported to and from the automobile. The bin 6, being fixed to central body 4, can be used for permanent storage, if so desired. The strap 12 is used to transport the modular unit to and from the automobile seat location.

Assembly of the clipboard mechanism proceeds as follows. With reference to FIGS. 4–9, the subplate 82 is affixed to the bottom surface of clipboard top 80, as post 92 protrudes through aperture 106, and posts 94, 96, protrude into slots 110, 108, respectively. The fasteners 102 are pressed around posts 94, 96 to connect the subplate 82 to the clipboard top 80. So assembled, plate 82 pivots about the circular boss 92, as posts 94, 96 travel back and forth within slots 110, 108.

The detents 112 in subplate 82 receive the locking fingers 100 of flanges 98 as posts 94, 96 travel the length of slots 108, 110. At each detent location, the relative position of the clipboard top 80 is fixed relative to the subplate 82. However, by manual pressure, further rotation of the subplate 82 and the clipboard top 80 can be re-initiated.

With reference to FIGS. 10 and 11, mounting of the subplate and clipboard top assembly to the base storage container will become apparent. The clipboard assembly, comprising clipboard top 80 and subplate 82, are positioned upon the forward portion of recessed surface 115, with downturned edge flanges 114 of the subplate 82 aligned with edge flanges 116. As the downturned edge flanges 114 of subplate 82 move rearward, they enter the channels defined below flanges 116, and the clipboard assembly is thereby connected to the top recessed surface 115.

FIG. 3 and FIG. 11 illustrate the various positions of the clipboard assembly relative to the base unit, and the linear path traveled by the clipboard assembly as the subplate 82 moves relative to the flanges 116. At any linear position depicted in FIG. 3, the clipboard top 80 can be rotated to any of the angular positions shown in FIG. 2. Thus, the user, seated adjacent to the workstation unit, can pivot the clipboard top 80 relative to the subplate 82, and/or bring the clipboard assembly outward from the base, into a writing orientation and proximity. Finally, if the user so desires, the clipboard assembly can be moved outward a sufficient distance to escape the edge flanges 116 shown in FIG. 11, whereby the clipboard assembly can be lifted from the recessed surface 115 and used as a transportable writing surface.

The flexibility and capabilities of the subject invention will be readily appreciated from FIGS. 1–11. Besides providing a convenient storage unit for documents or files, the subject invention also provides a writing surface which can be moved and adjusted relative to the user into a writing orientation. The storage position shown in FIG. 2, places the writing surface out of the way of the vehicle operator. In use, however, the writing surface can be pivoted, and or linearly moved, to suit the comfort and preference of the user. Also, it will be noted that the writing surface of the clipboard is fully supported throughout, enabling the user to write without having to support the assembly.

The stability of the modular workstation 2 is enhanced by the seat belt engagement described previously. In addition, the removable bin 8 adds stability to the workstation when situated over the automobile seat. Also, it will be appreciated that the writing surface rotates about an eccentric axis, as shown in FIG. 2, such that a document situated on the clipboard surface maintains a reading orientation relative to the user seated adjacent to the workstation unit.

While the above describes the preferred embodiment of the subject invention, the present invention is not to be so confined. Other embodiments, which will be apparent to one skilled in art, and which utilize the teaches herein set forth, are intended to be within the scope and spirit of the present invention.

We claim:

1. A modular workstation for use in an automobile of the like, comprising:
 a base container having four sidewalls, a bottom surface, and a top surface, said base container being adapted for positionment on an automobile seat, proximate to the user;
 support surface means repositionable from a storage position upon said base container top surface into selective alternate second positions in relatively closer proximity to the workstation user,
 writing surface means pivotally mounted upon said support surface means, and moveable with said support surface means between said storage position and said second positions in writing proximity to the workstation user; said writing surface pivoting about a vertical pivot axis which extends through said support surface means and which is repositioned therewith as said support surface means is moved from said storage position into said second alternate positions, whereby said writing surface means pivoting so as to assume a reading orientation to the user in said second alternate positions.

2. A workstation according to claim 1, wherein said vertical pivot axis extends eccentrically through said writing surface means.

3. A workstation according to claim 2, wherein said writing surface means and said support surface means moving along a linear path relative to said base container from said storage position to said alternate second positions.

4. A workstation according to claim 3, said writing surface means independently rotating about said vertical pivot axis at any position along said linear path with said support surface means remaining stationary.

5. A workstation according to claim 4, wherein said writing surface means being removable from said base container for use as a transportable writing surface.

6. A workstation according to claim 5, wherein said writing surface means having means for retaining paper thereon.

7. A workstation according to claim 6, said writing surface means comprising a clipboard and said means for retaining paper comprising a pivotally mounted clamping member.

8. A workstation according to claim 1, said base container having a writing instrument storage compartment therein.

9. A workstation according to claim 1, said workstation including a secondary storage container for positionment adjacent to said base container and having means for releasably attaching to said base container; said secondary container having an internal storage compartment and a top opening lid, whereby said storage compartment being accessible to the user when said secondary container is attached to said base container.

10. A workstation according to claim 9, said workstation having retention means for receiving a seat belt of the automobile, whereby retaining said workstation on the automobile seat.

11. A workstation according to claim 10, said retention means comprising a channel formed between the storage container and said base container, positioned to align and receive the seat belt therethrough.

12. A modular workstation for use in an automobile or the like, comprising:
an elongate base container having four sidewalls, a bottom surface and a top surface defining therebetween an internal storage chamber, the base container being adapted for positionment on an automobile seat, proximate to the workstation user, said base container having a longitudinal axis terminating at a rearward end fixedly positionable proximate a backrest of said automobile seat and a forward end fixedly positionable adjacent a forward edge of said seat;
writing surface means mounted to said base container top surface in writing proximity to the workstation user, said writing surface means having a substantially planar top writing surface and a longitudinal axis oriented transversely of said longitudinal axis of said base container;
support surface means mounted to said base container top surface and supporting said writing surface means, said support surface means being extendable along a linear path, transverse to said base container longitudinal axis; and
retention means for retaining the workstation on the automobile seat.

13. A workstation according to claim 12, further comprising a secondary storage container for positionment adjacent to said base container and having means for releasable attachment to said base container, said secondary storage container depending downward form said forward edge of said seat when attached to said base container, and said secondary storage container having sidewalls and an upwardly opening lid cooperatively defining an internal storage chamber, whereby upon said lid opening upwardly, said internal storage chamber is accessible to a user positioned to a side of said workstation when said secondary storage container attached to said base container.

14. A workstation according to claim 13, said retention means comprising an upwardly open channel defined by parallel sidewalls extending transverse to said longitudinal axis of said base container, positioned to align and receive a seat belt therethrough.

15. A workstation according to claim 12 or claim 14, said writing surface means being removable from said base container for use as a transportable writing surface.

16. A workstation according to claim 15, said writing surface means moving with said support surface means along said linear path from a retracted storage position into selective alternate second positions, whereby being adjustably repositionable by the user.

17. A workstation/according to claim 16, said writing surface means rotating about a-central axis which is moveable between said storage position and said second position, whereby a document upon said writing surface means maintaining a reading orientation relative to the user during said movement.

18. A workstation according to claim 17, said writing surface means having means for retaining paper thereon.

19. A workstation according to claim 18, wherein said writing means comprising a clipboard.

20. A modular workstation for use in an automobile or the like, comprising:
a base container for positionment on an automobile seat, proximate the workstation user, said base container having an internal storage chamber and an upwardly pivotal top lid member, whereby upward pivotal movement of said lid member serving to expose said internal storage chamber to a workstation user positioned to a side of said base container,
a second container removably affixed to a forward side of said base container, and extending downward beyond said automobile seat, whereby stabilizing said workstation upon said seat;
said second container comprising sidewalls and an upwardly pivotal upper lid member cooperatively defining an internal storage compartment, whereby upward pivotal movement of said second container lid member serving to expose said internal storage compartment to said workstation user; and
said base container internal storage chamber and said second container internal storage compartment being in accessible proximity to said workstation user with respective said lid members in an open condition, and said base container lid member and said second contain lid member pivoting open away from the workstation user, whereby contents of said chamber and said compartment being transferrable therebetween by the workstation user.

21. A workstation according to claim 20, said second container being releasably attached to said base container, whereby, upon disengagement, serving as a transportable bin.

22. A workstation according to claim 21, said forward side of said base container having upwardly open socket means formed therein, and said second container having outwardly projecting attachment lug means downwardly receivable into said socket means, whereby said disengagement of said second container being by upward movement thereof relative to said base container.

23. A workstation according to claim 20, said workstation means having retention means for receiving a seat belt of the automobile, whereby restraining said workstation on the automobile seat.

24. A workstation according to claim 23, said workstation having a third container connected to an inward side of said base container and said retention means comprising an elongate channel formed between said base container and said third container for receipt of the automobile seat belt.

25. A workstation according to claim 20, said base container having top writing surface means in writing proximity to the workstation user.

26. A workstation according to claim 25, said writing surface means being removable from said base container for use as a transportable writing surface.

27. A workstation according to claim 25, said writing surface means being moveable between a storage position and a second position in writing proximity to the workstation user.

28. A workstation according to claim 27, said writing surface means comprising support plate means, and a top writing surface component supportively positioned upon said support plate means, said writing surface component rotating about a vertical axis extending through said support plate means in said second position, whereby assuming a writing orientation to the workstation user.

29. A workstation according to claim 28, said writing surface means being secondarily moveable along a linear path relative to said base container between said storage position and said second position, and said vertical axis of rotation extending through said support means moving along said linear path therewith.

30. A workstation according to claim 29, said writing surface means being removable from said base container for use as a transportable writing surface.

* * * * *